US007652241B2

(12) United States Patent
Cheah et al.

(10) Patent No.: US 7,652,241 B2
(45) Date of Patent: Jan. 26, 2010

(54) IMAGE ACQUISITION TIMING SYSTEM AND METHOD

(75) Inventors: Chiang Sun Cheah, Penang (MY); Bernard Ly Hock Chan, Penang (MY); Tong Seng Liew, Perak (MY); Ming Yong Mau, Penang (MY)

(73) Assignee: Aptina Imaging Corporation, Grand Cayman (KY)

( * ) Notice: Subject to any disclaimer, the term of this patent is extended or adjusted under 35 U.S.C. 154(b) by 1175 days.

(21) Appl. No.: 10/754,950

(22) Filed: Jan. 9, 2004

(65) Prior Publication Data

US 2005/0151721 A1 Jul. 14, 2005

(51) Int. Cl.
*G01J 1/44* (2006.01)
*G01J 1/32* (2006.01)

(52) U.S. Cl. .................................. 250/214 R; 250/205

(58) Field of Classification Search ................ 250/206, 250/208.4, 205; 356/5.04, 5.06, 451, 452, 356/454; 327/20, 141, 182–183, 514, 392–395; 396/161, 166, 167, 187; 361/28
See application file for complete search history.

(56) References Cited

U.S. PATENT DOCUMENTS

| | | | | |
|---|---|---|---|---|
| 4,129,780 A * | 12/1978 | Laughlin | .................... | 250/333 |
| 4,933,549 A * | 6/1990 | Fujioka et al. | .............. | 250/235 |
| 5,640,005 A * | 6/1997 | Oda | | |
| 6,373,557 B1 * | 4/2002 | Mengel et al. | ............. | 356/4.07 |

* cited by examiner

*Primary Examiner*—Georgia Y Epps
*Assistant Examiner*—Jennifer Bennett
(74) *Attorney, Agent, or Firm*—RatnerPrestia

(57) ABSTRACT

A system and method for timing image acquisitions provide an optical charge pulse to a sensor within an optical imaging system prior to image acquisitions by the optical imaging system. This optical charge pulse compensates for dark current discharge in the sensor.

15 Claims, 4 Drawing Sheets

IMAGE ACQUISITION TIMING SYSTEM AND METHOD

BACKGROUND OF THE INVENTION

Optical sources and sensors are included in a variety of optical imaging systems. In a typical optical imaging system, an optical source including one or more LEDs or other emitters illuminates a target, such as an imaging surface or navigation surface. The sensor detects reflected, scattered or transmitted light from the illuminated target. In an optical imaging system used for navigation, outputs from the sensor are processed to extract position, velocity, acceleration, or other motion parameters of the optical imaging system relative to the target. In other applications, the output from the sensor is processed to characterize features of the illuminated target.

FIG. 1 shows an exemplary control signal C for timing image acquisitions in a conventional optical imaging system (shown in FIG. 2). In this example, the optical source within the optical imaging system is turned "on" by a falling edge transition in the control signal C and turned "off" by a rising edge transition in the control signal. Image acquisitions are triggered to occur at the same falling edge transition that turns the optical source "on".

When the optical source is "off", the target is not illuminated and the sensor does not receive light. During this "off" time the sensor will typically discharge due to current leakage (referred to as "dark current") inherent within the devices used to implement the sensor, which can affect the sensitivity or transfer characteristics of the sensor.

In optical imaging systems where the sensor includes one or more CMOS detectors, photodiodes or other transducers, non-uniform discharge between these devices can result in non-uniform image sensitivity or artifacts in the images acquired when the sensor initially receives light from re-illumination of the target. In optical imaging systems used for navigation, dark current discharge of the sensor can result in cursor jump upon re-illumination of the target.

One approach avoids the dark current discharge of the sensor by illuminating the target continuously, so that the sensor continuously receives light. This approach has the obvious disadvantage of high power consumption, as constant illumination of the target translates to the optical source being on continuously. In a portable optical imaging system, such as an optical mouse for a computer, this high power consumption can lead to unacceptably low battery life. Accordingly, there is a need for an alternative way to accommodate for dark current discharge in the sensor within an optical imaging system.

SUMMARY OF THE INVENTION

A system and method for timing image acquisitions according to the embodiments of the present invention provide an optical charge pulse to a sensor within an optical imaging system prior to image acquisitions by the optical imaging system. This optical charge pulse compensates for dark current discharge in the sensor.

DETAILED DESCRIPTION OF THE EMBODIMENTS

Figure 1:
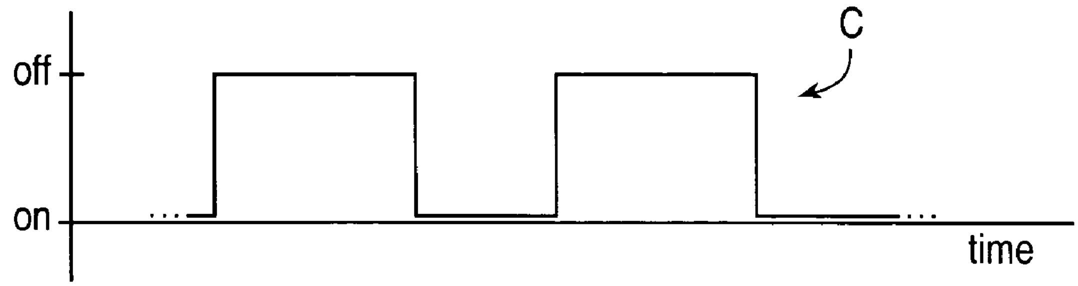
FIG. 1 (Prior Art)
FIG. 1 shows an exemplary control signal for timing image acquisitions in a conventional optical imaging system.
Figure 2:
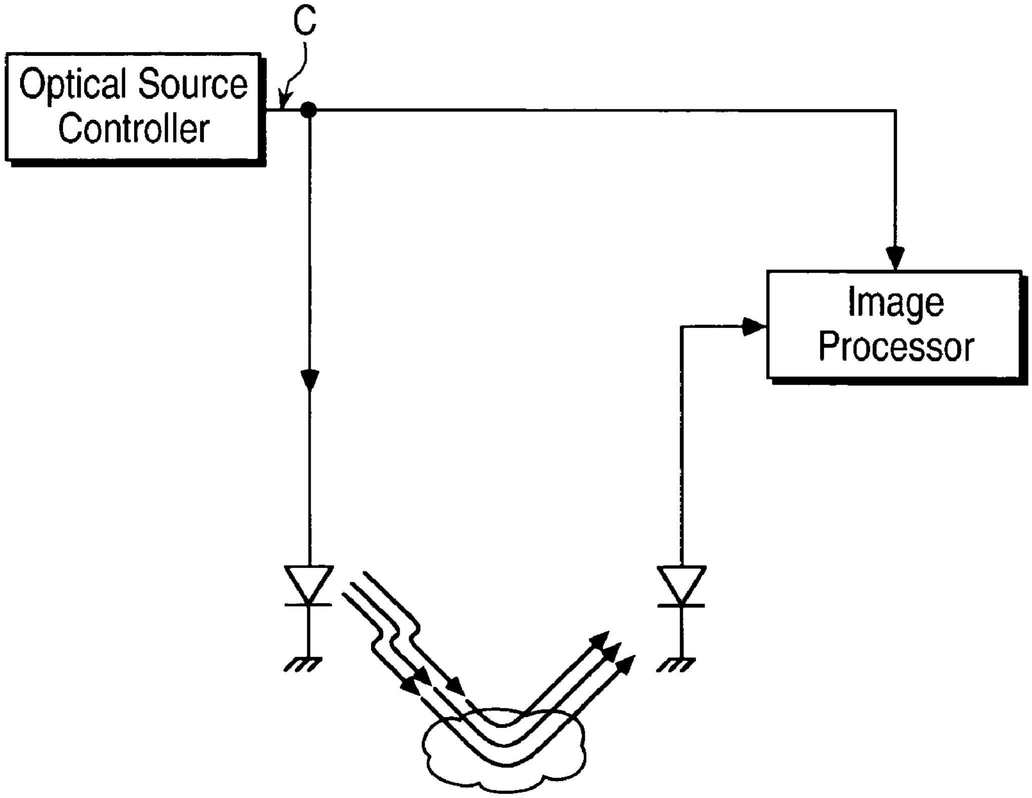
FIG. 2 (Prior Art)
FIG. 2 shows a conventional optical imaging system.
Figure 3:
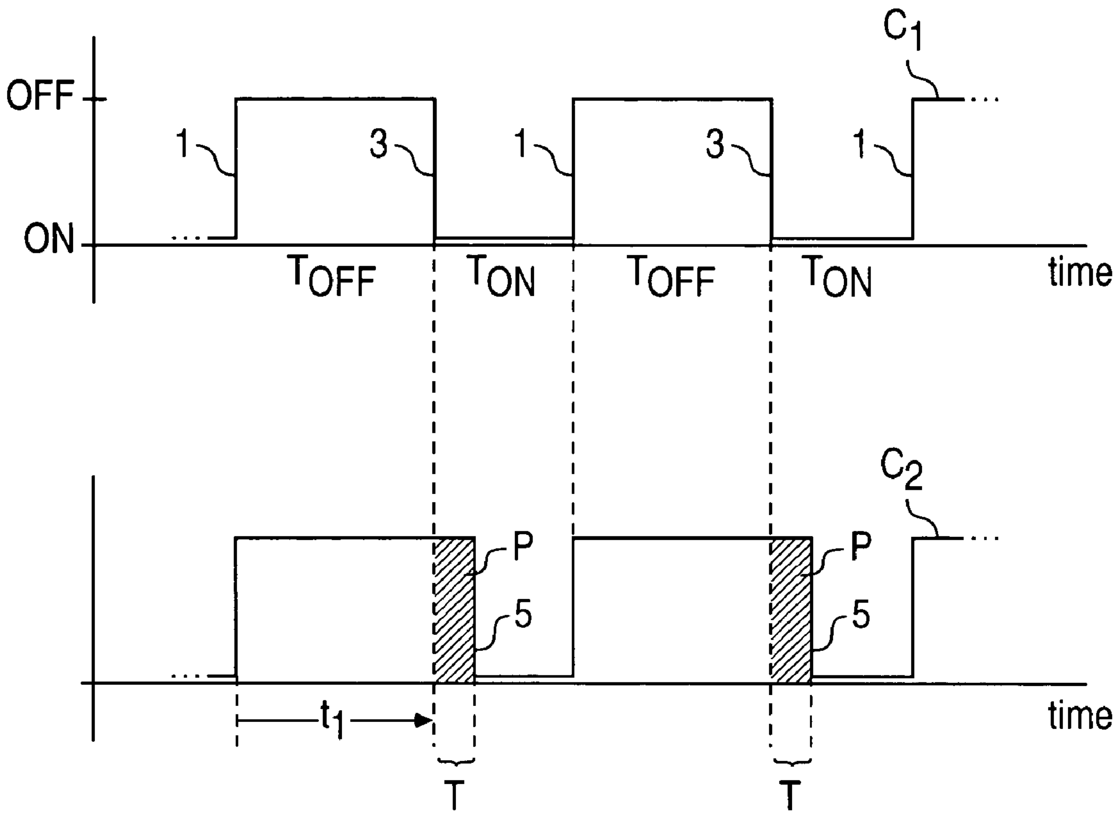
FIG. 3 shows exemplary control signals associated with a system and method for timing image acquisitions according to the embodiments of the present invention.

FIG. 3 shows exemplary control signals $C_1$, $C_2$ associated with a system 30 (shown in FIG. 4) and method 40 (shown in FIGS. 5-6) for timing image acquisitions in an optical imaging system 20, according to embodiments of the present invention. The optical imaging system 20 is shown including an optical source 2 and a sensor 6. The optical source 2 typically comprises a light emitting diode (LED) or other emitter, or an array of one or more LEDs or other emitters. The sensor 6 typically comprises one or more CMOS detectors, photodiodes or other transducers that convert light to electrical signals that can be processed by an image processor 8 within the optical imaging system 20.

The control signal $C_1$ is typical of the control signals within an optical imaging system 20. While the control signal $C_1$ is typically available within the optical imaging system 20, the control signal $C_1$ is alternatively generated, for example, using a signal source. The control signal $C_1$ has a first transition 1 (shown as a rising edge in FIG. 3) that turns the optical source 2 "off" and a second transition 3 (shown as a falling edge) that turns the optical source 2 "on". This second transition 3 that turns the optical source 2 "off" triggers the optical source 2 to illuminate a target 4, such as an imaging surface or a navigation surface.

A second control signal $C_2$ has a transition 5, such as a falling edge, that triggers image acquisitions by the sensor 6 and image processor 8 when the target 4 is illuminated. This transition 5 within the control signal $C_2$ follows the transition 3 of the control signal $C_1$ and is delayed by a delay interval T. The portion of the control signal $C_2$ within the delay interval T establishes an optical charge pulse P that is sufficient to compensate for dark current discharge of the sensor 6 within the optical imaging system 20.

Figure 4:
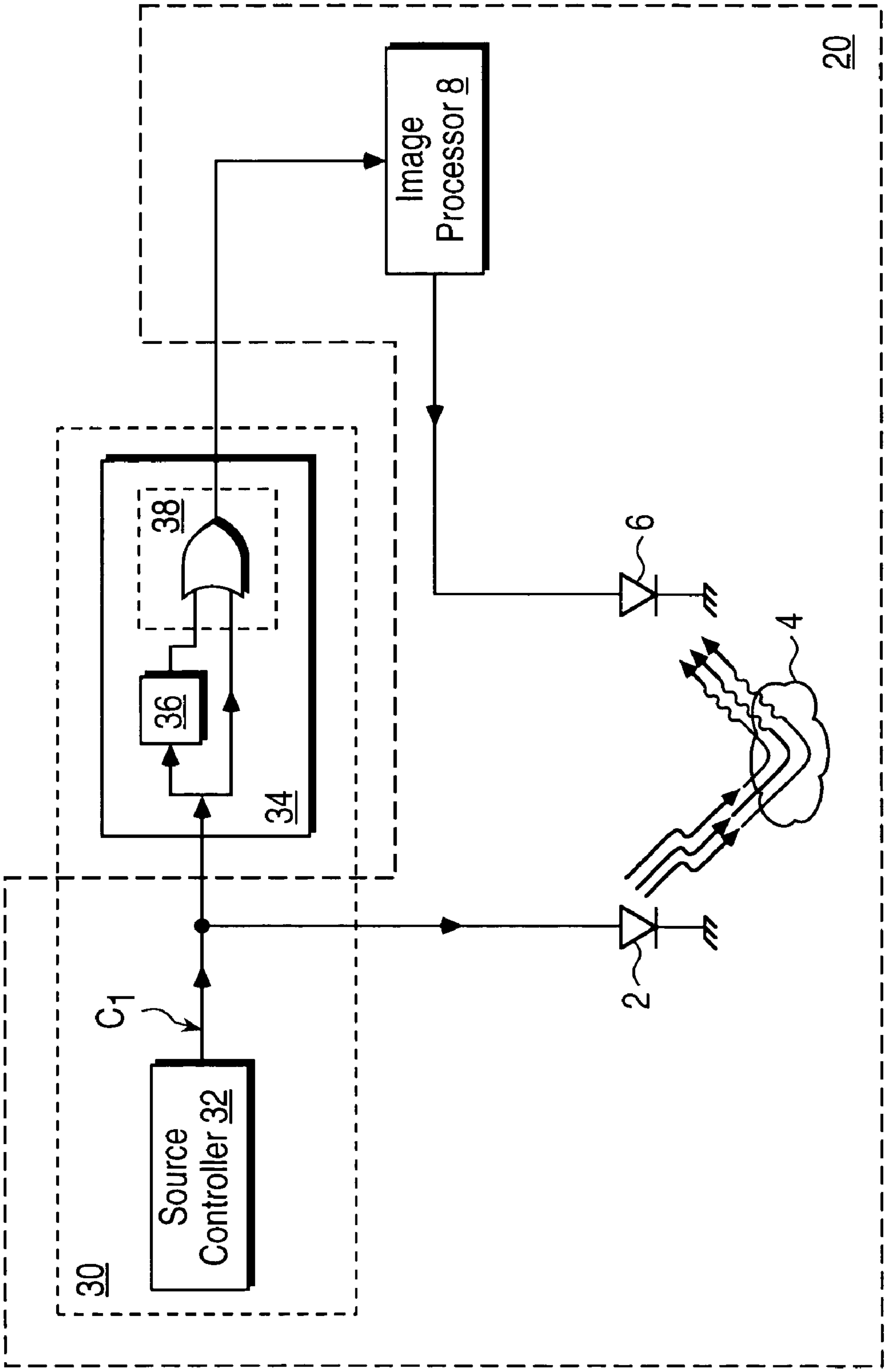
FIG. 4 shows the system for timing image acquisitions according to embodiments of the present invention.
Figure 5:
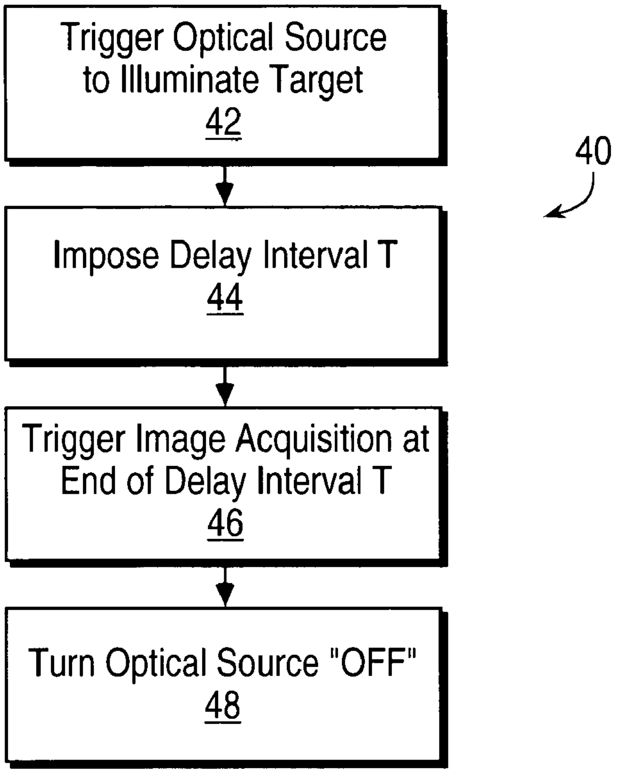
FIGS. 5-6 show the method for timing image acquisitions according to alternative embodiments of the present invention.

FIG. 4 shows the system 30 for timing image acquisitions according to embodiments of the present invention. In one example, the control signal $C_2$ is generated in response to the control signal $C_1$. Alternatively, the control signals $C_1$, $C_2$ are independently generated. A source controller 32 within the system 30 provides the control signal $C_1$ to the optical source 2, which is turned "on" or "off" according to the designated transitions 1, 3 within the control signal $C_1$.

The source controller 32 provides an "on" transition (in this example a falling edge) to the optical source 2, which turns the optical source 2 "on" for a time interval $T_{ON}$. When "on", the optical source 2 illuminates the target 4. At the end of the time interval $T_{ON}$, the source controller 32 provides an "off" transition (in this example a rising edge) to the optical source 2, which turns the optical source "off" for a time interval $T_{OFF}$. When "off", the optical source 2 is in a low power consumption state and does not illuminate the target 4.

A delay block 34 within the system 30 is coupled between the source controller 32 and the image processor 8 that is coupled to the sensor 6. The delay block 34, including a delay stage 36 and a logic stage 38, generates the control signal $C_2$ in response to the control signal $C_1$, which is also applied to the delay block 34. The control signal $C_2$ provides the transition 5, which triggers the image processor 8. In response to this trigger, which in this example is a falling edge, light from the illumination of the target 4 is intercepted by the sensor 6 and processed by the image processor 8, resulting in the acquisition of one or more images by the optical imaging system 20.

While falling edges are shown providing the trigger for turning the optical source 2 "on" and providing the trigger for images acquired in the above example, other types of transitions are alternatively used to provide these triggers. Based on the type of the transitions, the delay block 34 appropriately processes the transitions 1, 3 provided in the control signal $C_1$ to provide the optical charge pulse P. With the transition provided in this example, the delay block 34 has a logic stage 38 that includes an OR logic element to provide the optical charge pulse P. The optical charge pulse P has sufficient amplitude and/or width T to compensate for the effects of dark current discharge in the sensor 6 by turning the optical source 2 "on" prior to the triggering of image acquisitions by the transition 5 in the control signal $C_2$. While the optical charge pulse P is shown as a rectangular pulse, the optical charge pulse P alternatively has any of a variety of shapes that are suitable to compensate for the effects of dark current discharge of the sensor 6.

Figure 6:
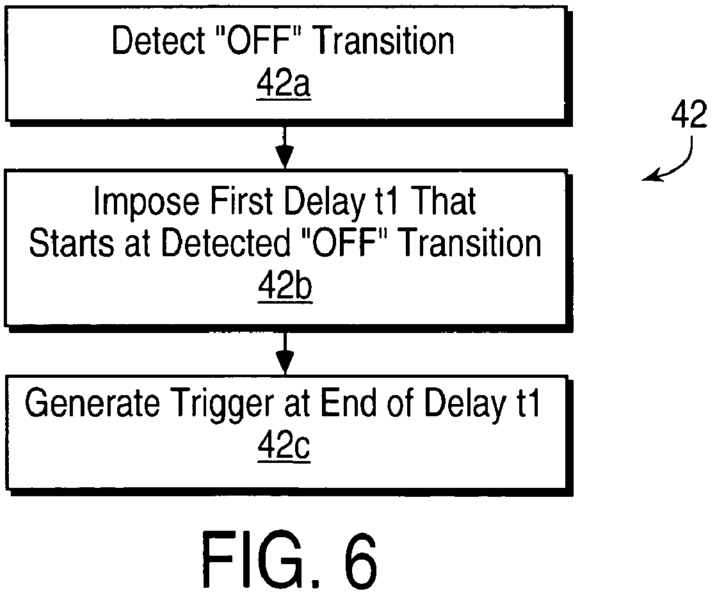

Alternative embodiments of the present invention are directed toward a method 40 for timing image acquisitions. The method 40 shown in FIG. 5 includes triggering the optical source 2 to illuminate the target 4 (step 42). This step 42 typically includes steps 42*a*-42*c* as shown in FIG. 6. Step 42*a* includes detecting an "off" transition, provided from step 48 in which the optical source 2 is turned "off" after image acquisition. In this example, the "off" transition is the rising edge within the control signal $C_1$. In step 42*b* a first delay t1 that starts at the "off" transition detected in step 42*a* is imposed. In step 42*c*, a trigger is generated at the end of the delay t1. This trigger is the transition 3 within the signal $C_1$ that turns the optical source 2 "on", triggering the optical source 2 to illuminate the target in step 42.

The method 40 for timing image acquisitions then includes imposing the delay interval T, starting when the optical source 2 is triggered to illuminate the target 4 (step 44), and triggering image acquisition at the end of the delay interval T (step 46). The optical source 2 is turned "off" in step 48 after the image acquisition. Typically, these steps 42-48 are repeated periodically, wherein the rate at which the steps are repeated is determined according to the application in which the optical imaging system 20 is used.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A system for timing an image acquisition, comprising:

a source controller triggering an optical source to illuminate a target during an on-time period;

a delay block coupled to the source controller, imposing a delay interval starting at the triggering of the optical source, the delay block triggering an image acquisition at the end of the delay interval, wherein after the image acquisition the source controller turns both the optical source and the image acquisition off, so that the on-time period of the optical source is longer than an on-time period of the image acquisition, and the delay interval defines an optical charge pulse that provides light to a sensor prior to triggering the image acquisition, wherein the optical charge pulse charges the sensor to compensate for dark current discharge in the sensor, and the sensor provides the image acquisition, and endings of the on-time period of the optical source and the on-time period of the image acquisition occur simultaneously.

2. The system of claim 1 wherein triggering the optical source to illuminate the target includes detecting a transition that turns the optical source off, imposing a delay period that starts at the detected transition, and actuating a trigger at the end of the delay period for triggering the optical source to illuminate the target.

3. The system of claim 1 wherein the source controller provides first control signal to the optical source and to the delay block, and wherein the delay block generates a second control signal in response to the first control signal.

4. The system of claim 3 wherein the first control signal includes a first transition triggering the optical source to illuminate the target and a second transition that turns the optical source off.

5. The system of claim 3 wherein the second control signal includes a transition triggering the image acquisition at the end of the delay interval.

6. The system of claim 4 wherein the second control signal includes a transition triggering the image acquisition at the end of the delay interval.

7. The system of claim 3 wherein triggering the image acquisition includes providing the second control signal to an image processor within an optical imaging system.

8. The system of claim 4 wherein triggering the image acquisition includes providing the second control signal to an image processor within an optical imaging system.

9. method for timing an image acquisition, comprising:

triggering an optical source to illuminate a target during an on-time period;

imposing a delay interval starting at the triggering of the optical source;

triggering an image acquisition at the end of the delay interval; and after the image acquisition, turning both the optical source and the image acquisition off;

wherein the delay interval defines an optical charge pulse that provides light to a sensor within an optical imaging system prior to the triggering of the image acquisition, and wherein the optical charge pulse charges the sensor to compensate for dark current discharge in the sensor, and the sensor provides the image acquisition, and wherein the on-time period of the optical source is longer than an on-time period of the image acquisition, and ending of the on-time period of the optical source and the on-time period of the image acquisition occur simultaneously.

10. The method of claim 9 wherein triggering the optical source to illuminate the target includes detecting a transition that turns the optical source off, imposing a delay period that starts at the detected transition, and actuating a trigger at the end of the delay period for triggering the optical source to illuminate the target.

11. The method of claim 9 wherein the triggering the optical source to illuminate the target is provided by a first transition and the turning the optical source off is provided by a second transition.

12. The method of claim 9 further comprising providing a first control signal triggering the optical source to illuminate the target.

13. The method of claim 11 further comprising providing a first control signal that provides the first transition and the second transition.

14. The method of claim 12 further comprising providing a second control signal in response to the first control signal, the second control signal triggering the image acquisition at the end of the delay interval.

15. The method of claim 13 further comprising providing a second control signal in response to the first control signal, the second control signal triggering the image acquisition at the end of the delay interval.

* * * * *